United States Patent
Sakata

(10) Patent No.: US 7,734,860 B2
(45) Date of Patent: Jun. 8, 2010

(54) SIGNAL PROCESSOR

(75) Inventor: Goro Sakata, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 598 days.

(21) Appl. No.: 11/704,042

(22) Filed: Feb. 8, 2007

(65) Prior Publication Data

US 2007/0233934 A1 Oct. 4, 2007

(30) Foreign Application Priority Data

Feb. 17, 2006 (JP) ............................ 2006-041202

(51) Int. Cl.
*G06F 13/00* (2006.01)

(52) U.S. Cl. ..................... 711/100; 700/4; 710/111; 710/113; 710/117

(58) Field of Classification Search .............. 710/117, 710/113, 111; 700/4
See application file for complete search history.

(56) References Cited

U.S. PATENT DOCUMENTS

| 5,590,364 | A * | 12/1996 | Hanzawa et al. ............... 712/43 |
| 6,770,806 | B2 * | 8/2004 | Okamura et al. .............. 84/609 |
| 6,772,023 | B1 * | 8/2004 | Imai ............................. 700/94 |
| 6,895,459 | B2 * | 5/2005 | Hadwiger et al. ........... 710/111 |
| 2004/0049293 | A1 * | 3/2004 | Hadwiger et al. .............. 700/4 |
| 2005/0005050 | A1 * | 1/2005 | Lin et al. ..................... 710/113 |
| 2005/0114583 | A1 * | 5/2005 | Beale .......................... 710/308 |

FOREIGN PATENT DOCUMENTS

| CN | 1448854 A | 10/2003 |
| JP | 10-260831 A | 9/1998 |

OTHER PUBLICATIONS

Chinese Office Action dated May 9, 2008 (4 pages), and English translation thereof (6 pages), issued in counterpart Chinese Application Serial No. 200710005180.2.

* cited by examiner

*Primary Examiner*—Mark Rinehart
*Assistant Examiner*—Christopher A Daley
(74) *Attorney, Agent, or Firm*—Frishauf, Holtz, Goodman & Chick, P.C.

(57) ABSTRACT

For every sampling period of a DSP 100, a timing generator 200 requests a CPU 300 to release a bus and provides a DSP 100 access time period to make an external memory 400 access the DSP 100 by occupying the bus released according to the request. In the DSP 100, during the DSP access time period, a memory interface section 11 executes read/write processing in which waveform data read from the external memory 400 is stored in an internal memory 12 and waveform data read from the internal memory 12 is written into the external memory 400 according to the command stored in an access command memory 10. At the same time, an operation section 13 executes operation processing by using the waveform data stored in the internal memory 12 independently of the read/write processing.

3 Claims, 4 Drawing Sheets

FIG.2

| ADDRESS | COMMAND | OFFSET VALUE |
|---|---|---|
| 0000H | Read | a |
| 0001H | Read | b |
| 0002H | Write | c |
| 0003H | Read | d |
| 0004H | Write | e |
| 0005H | Write | f |
| 0006H | Read | g |
|  |  |  |
|  |  |  |
| 0020H |  |  |
| 0021H |  |  |
| 0023H |  |  |
| 0024H | End |  |

SIGNAL PROCESSOR

CROSS-REFERENCE TO RELATED APPLICATION

This application is based upon and claims the benefit of priority from the prior Japanese Patent Application No. 2006-041202, filed 17 Feb. 2006, the entire contents of which is incorporated herein by reference.

BACKGROUND OF THE INVENTION

1. Field of the Invention

The present invention relates to a signal processor suitably used as a sound generator of electronic musical instruments.

2. Description of the Related Art

A signal processor including a logic operation element which is called a digital signal processor (DSP) and processes multiplication-addition-calculation (MAC); product-sum-operation) at high speed under the control by the CPU has been known. In general, in the signal processor, data to be processed is stored in an external memory. According to a direction by the CPU, the data to be processed is sequentially captured from the external memory and provided with signal processing. For example, in a signal processor used as a sound generator of electronic musical instruments, waveform data stored in the external memory is read for each sampling period, the read waveform data is provided with delay feedback operation and filter operation (for example, FIR filter) to form musical sound with various overtone structures, the formed musical sound is provided with various effects such as delay, and the result is outputted.

As such a signal processor as above, for example, Japanese Laid-Open Patent Publication No. 10-260831 discloses a signal processor as follows. The signal processor is composed of a first processing section for performing signal processing under the control by the CPU and a second processing section for performing read/write processing in relation to the external memory independently of the first processing section. The first processing section performs the signal processing in preference to the read/write processing of the second processing section which synchronizes a time slot different from the time slot of the first processing section. Thereby, the external memory including the second processing section functions as an internal memory for the first processing memory. In result, wasteful time in accessing the external memory is omitted, and the processing speed is improved.

In a signal processor structured so that the CPU and the DSP share an external memory via the same bus, the CPU manages the bus fundamentally. In the signal processor structured as above, when the DSP occupies the bus, the DSP requests the CPU to release the bus, and the CPU correspondingly releases the bus. Therefore, the CPU receiving the bus release request needs latency variable to some extent from receiving the request from the DSP to actually releasing the bus. Further, the DSP side needs to wait until the request is received by the CPU every time when the DSP requests the CPU for memory access. Therefore, there is a problem that it causes lowering of the processing efficiency of the processor as a whole.

SUMMARY OF THE INVENTION

In view of the foregoing problem, it is an object of the invention to provide a signal processor which can access the external memory via the shared bus without causing lowering of the processing efficiency.

In accordance with an aspect of the present invention, there is provided a signal processor which includes a first operation processing means and a second operation processing means sharing an external memory means via a bus, comprising: an access time period setting means for requesting a bus release to the second operation processing means and setting an access time period by occupying the bus released from the second operation processing means according to the request for every sampling period of the first operation processing means, wherein, the first operation processing means executes read/write processing in relation to the external memory means during the access time period set by the access time period setting means for every sampling period.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a diagram showing an example of commands stored in an access command memory 10;

DETAILED DESCRIPTION OF THE PREFERRED EMBODIMENT

The present invention will hereinafter be described in detail with reference to the preferred embodiment shown in the accompanying drawings.

A. Structure of the Embodiment

Figure 1:
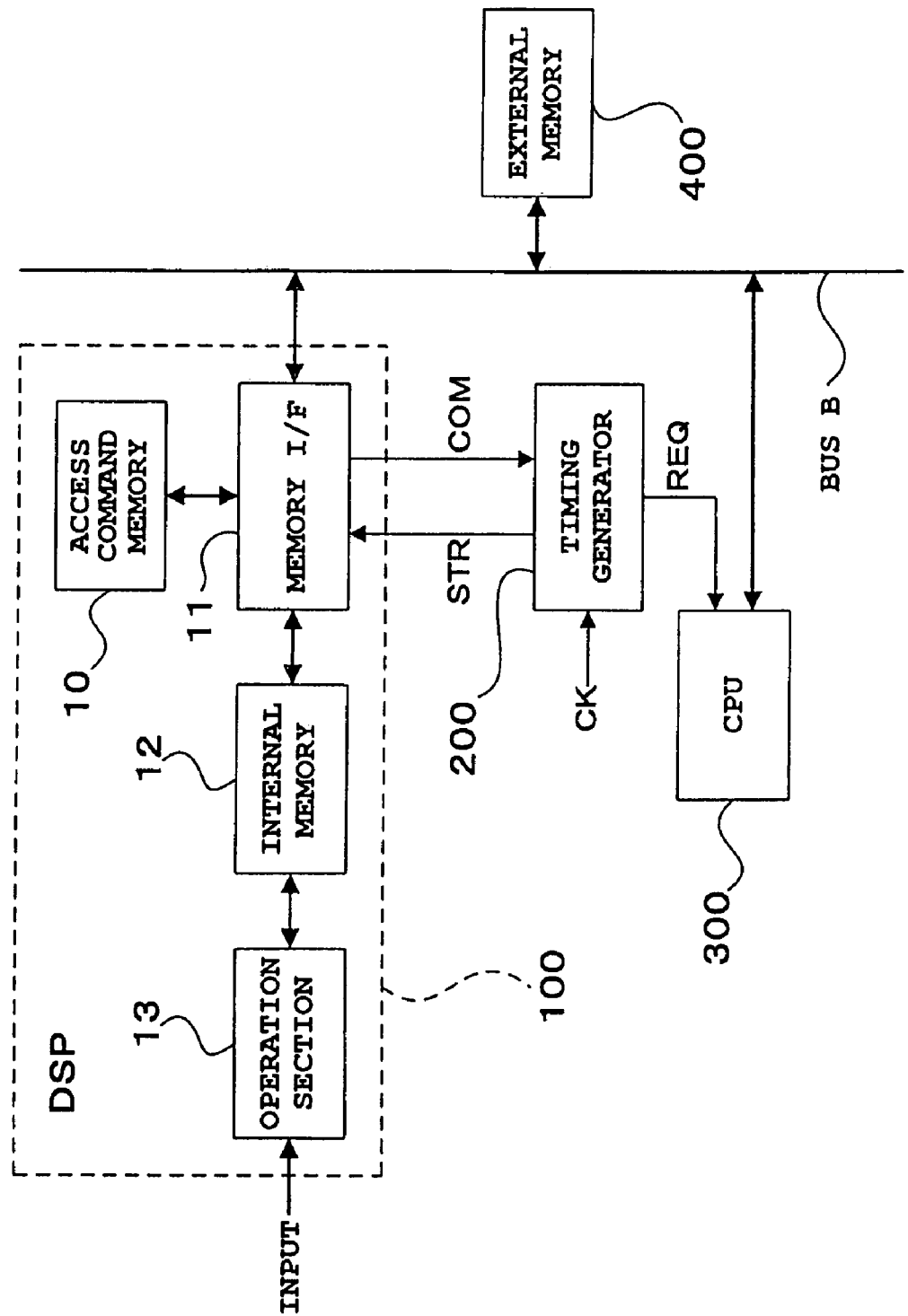
FIG. 1 is a block diagram showing a structure of a signal processor according to an embodiment of the invention.

FIG. 1 is a block diagram showing a structure of a signal processor according to an embodiment of the invention. The signal processor shown in the figure is used as a sound generator of electronic musical instruments. The signal processor is composed of a DSP 100, a timing generator 200, a CPU 300, and an external memory 400. In such a structure, the DSP 100 and the CPU 300 share the external memory 400 via a bus B so that lowering of the processing efficiency is not caused according to an access start signal STR (described later) and a bus release request signal REQ (described later) which are outputted from the timing generator 200. The structures of the respective sections will be hereinafter described.

The DSP 100 has an access command memory 10, a memory interface section 11, an internal memory 12, and an operation section 13. As an example shown in FIG. 2, the access command memory 10 stores access commands composed of a read command Read which directs reading data from the external memory 400 or a write command Write which directs writing data into the external memory 400 and an offset value designating a qualified address of the external memory 400 in the order of address. For the final address, an end command End representing completion of accessing the external memory 400 is provided.

The memory interface section 11 sequentially executes the access commands stored in the foregoing access command memory 10 every time when receiving the access start signal STR generated by the after-mentioned timing generator 200. Then, the memory interface section 11 performs read/write processing in relation to the external memory 400 via the bus B.

That is, when the access command read from the access command memory 10 is the read command Read, the memory interface section 11 reads waveform data from the address of the external memory 400 designated by the offset value in the access command, and stores the read waveform data in the internal memory 12. Meanwhile, when the access command read from the access command memory 10 is the write command Write, the memory interface section 11 writes data of the internal memory 12 into the address of the external memory 400 designated by the offset value in the access command.

Further, when the access command read from the access command memory 10 is the end command End representing completion of accessing the external memory 400, the memory interface section 11 completes accessing the external memory 400 via the bus B. At the same time, the memory interface section 11 generates an access completion signal COM, and supplies the signal to the timing generator 200.

The internal memory 12 includes a mirroring region and a work region. The mirroring region of the internal memory 12 stores data (waveform data and operation parameters) read by the memory interface section 11 from the external memory 400 according to the access command. The work region of the internal memory 12 stores the waveform data to be operated by the operation section 13.

The operation section 13 is composed of an arithmetic logic unit (ALU), a multiplier (MUL) or the like. For example, according to an operation direction inputted from outside, the operation section 13 reads the waveform data stored in the mirroring region of the internal memory 12 for every sampling period, performs delay feedback operation, and stores the operation result in the work region of the internal memory 12. The operation result stored in the work region of the internal memory 12 is read by the memory interface 11 and then written into the external memory 400 according to the access command.

Figure 3:
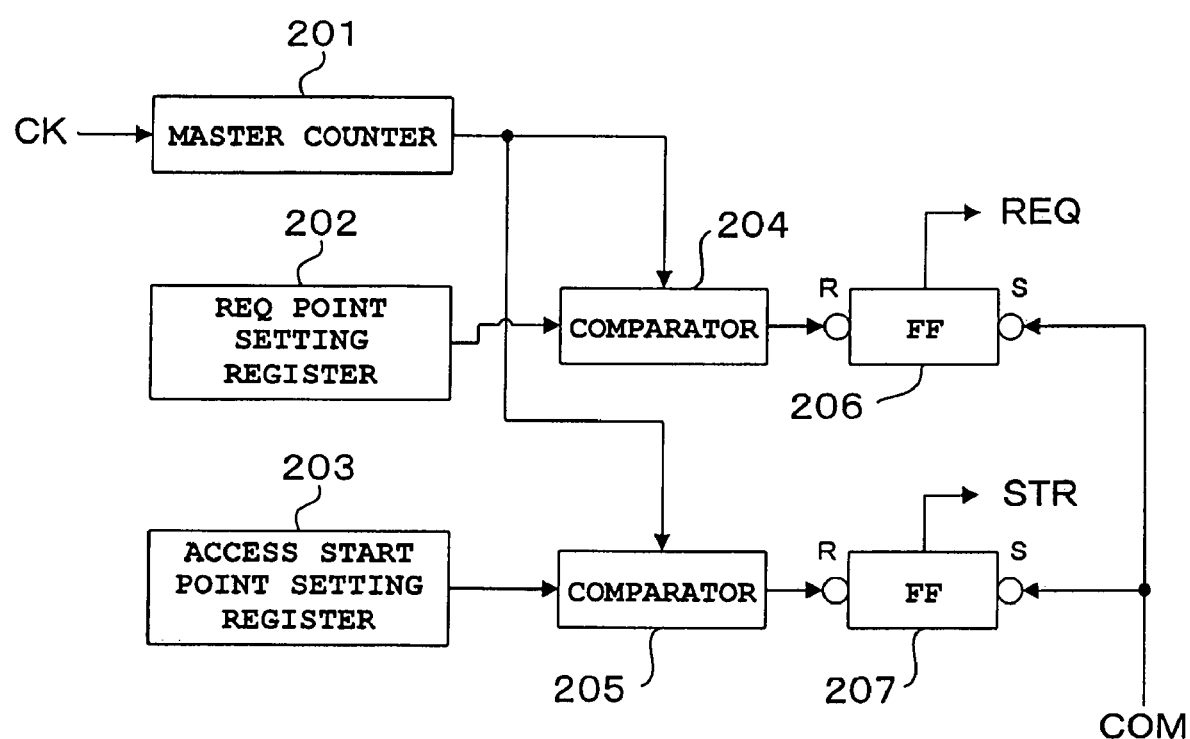
FIG. 3 is a block diagram showing a structure of a timing generator 200.

As shown in FIG. 3, the timing generator 200 is composed of a master counter 201, an REQ point setting register 202, an access start point setting register 203, comparators 204, 205, and flip flop circuits 206, 207. The master counter 201 counts a system clock CK, and outputs the resultant value. The counted value of the master counter 201 is reset for every sampling period.

The REQ point setting register 202 stores an REQ point value (fixed value) designating a generation timing of the bus release request signal REQ. The access start point setting register 203 stores an access point value (fixed value) designating a generation timing of the access start signal STR. The difference between the REQ point value and the access start point value is set by considering the longest command supposed in the CPU 300 using the external memory 400.

The comparator 204 compares the counted value of the master counter 201 to the REQ point value stored in the REQ point setting register 202, and generates an REQ point signal when the counted value of the master counter 201 corresponds with the REQ point value. The comparator 205 compares the counted value of the master counter 201 to the access start point value stored in the access start point setting register 203, and generates an access start point signal when the counted value of the master counter 201 corresponds with the access start point value.

The S-R type flip flop circuit 206 generates the bus release request signal REQ according to the REQ point signal supplied to a reset input R, and resets the bus release request signal REQ according to the access completion signal COM supplied to a set input S. The S-R type flip flop circuit 207 generates the access start signal STR according to the access start point signal supplied to the reset input R, and resets the access start signal STR according to the access completion signal COM supplied to the set input S.

B. Operation of the Embodiment

Next, operations of the signal processor structured as above will be hereinafter described with reference to the timing chart shown in FIG. 4.

Figure 4:
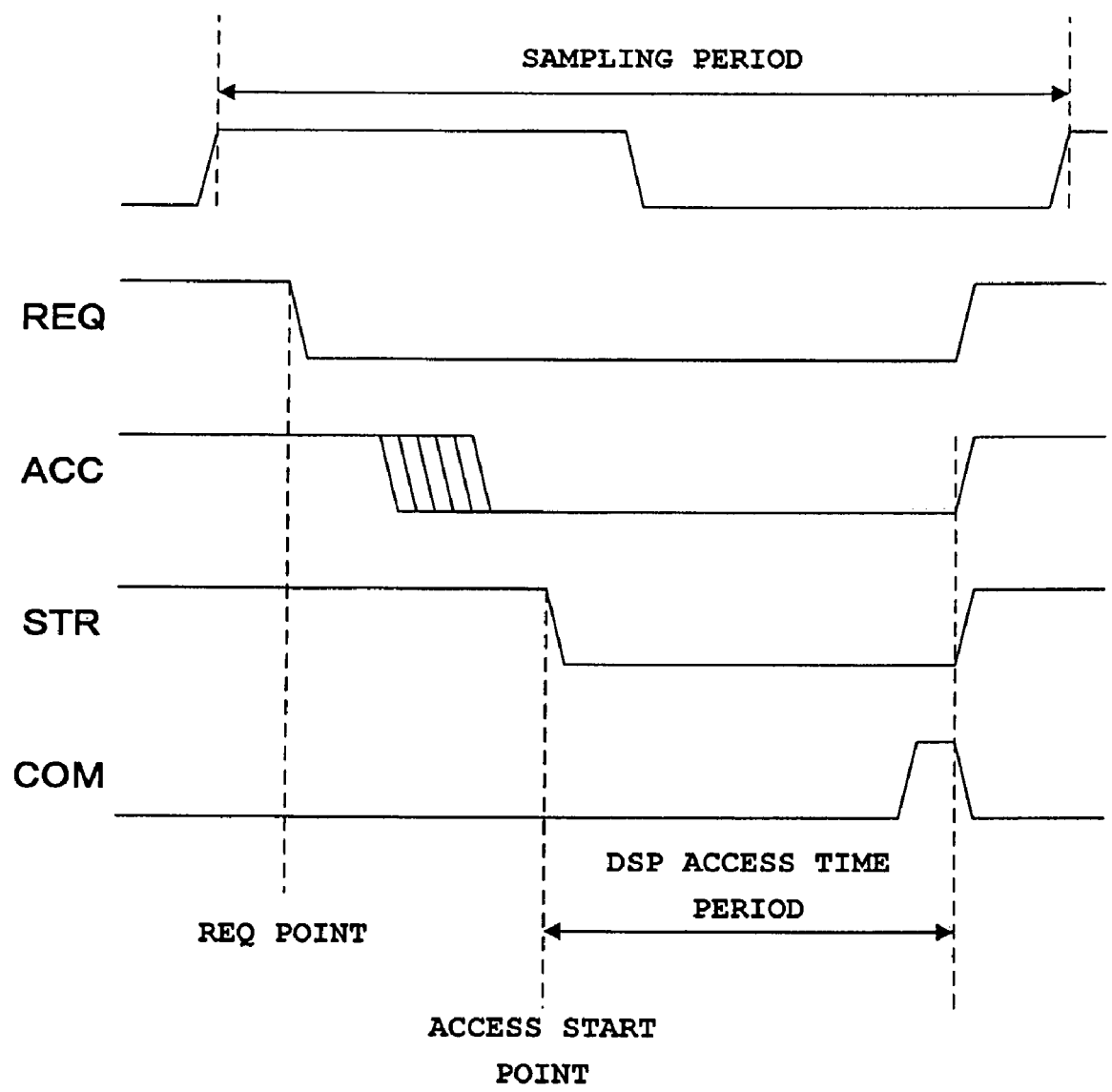
FIG. 4 is a timing chart for explaining operations of the signal processor.

FIG. 4 shows the timing relation among the bus release request signal REQ, a reception signal ACC, the access start signal STR, and the access completion signal COM in one sampling period. In the timing generator 200, when the counted value of the master counter 201 counting the system clock CK corresponds with the REQ point value stored in the REQ point setting register 202, the flip flop circuit 206 generates the bus release request signal REQ.

When the CPU 300 receives the bus release request signal REQ generated by the timing generator 200, the CPU 300 completes a command in execution, and then releases the bus B and generates the reception signal ACC. Since the CPU 300 executes various commands, it is not possible to determine what command is in execution at the time when the CPU 300 receives the bus release request signal REQ. Therefore, duration from the time when the CPU 300 receives the bus release request signal REQ to the time when the CPU 300 releases the bus and generates the reception signal ACC varies according to each sampling.

Accordingly, in the timing generator 200, the access start point value with a margin including the foregoing variation is stored in the access start point setting register 203. When the counted value of the master counter 201 counting the system clock CK corresponds with such an access start point value, the flip flop circuit 207 generates the access start signal STR, and supplies the signal to the DSP 100.

In the DSP 100, when receiving the access start signal STR, the memory interface section 11 performs read/write processing in relation to the external memory 400 via the bus B according to the series of access commands stored in the access command memory 10. When the access command read from the access command memory 10 becomes the command End representing completion of accessing the external memory 400, the memory interface 11 completes accessing the external memory 400 via the bus B, and at the same time generates the access completion signal COM and outputs the signal to the timing generator 200. The timing generator 200 resets the bus release request signal REQ and the access start signal STR according to the access completion signal COM supplied to each set input S of the flip flop circuits 206, 207.

As described above, in this embodiment, in the signal processor including the CPU 300 and the DSP 100 which share the external memory 400 via the bus B, for every sampling period of the DSP 100, the timing generator 200 requests the CPU 300 to release the bus and provides a DSP access time period to make the external memory 400 access the DSP 100 by occupying the bus released according to the request.

In the DSP 100, during the DSP access time period provided for every sampling period, the memory interface section 11 executes read/write processing in which the waveform data read from the external memory 400 is stored in the internal memory 12 and the waveform data read from the internal memory 12 is written into the external memory 400 according to the command stored in the access command memory 10. At the same time, the operation section 13 executes operation processing by using the waveform data stored in the internal memory 12 independently of the read/write processing.

Therefore, in the DSP 100, the wasteful time to wait until a request is received by the CPU every time when memory access is requested to the CPU in the existing arts is omitted. In result, it becomes possible to access the external memory via a common bus without causing lowering of the processing efficiency.

While the present invention has been described with reference to the preferred embodiments, it is intended that the invention be not limited by any of the details of the description therein but includes all the embodiments which fall within the scope of the appended claims.

What is claimed is:

1. A signal processor which includes a first operation processor and a second operation processor sharing an external memory via a bus, the signal processor comprising:
   an access time period setting section which requests a bus release to the second operation processor and sets an access time period by occupying the bus released from the second operation processor according to the request for every sampling period of the first operation processor;
   wherein the first operation processor executes read/write processing in relation to the external memory during the access time period set by the access time period setting section for every sampling period; and
   wherein the access time period setting section comprises:
      an access time period start direction section which generates a request signal requesting bus release and outputs the request signal to the second operation processor every time that a given time elapses from a start of the sampling period of the first operation processor, and which generates a start signal representing a start of the access time period and outputs the start signal to the first operation processor after waiting a given time from when the request signal was generated; and
      an access time period end direction section which ends the access time period by directing the access time period start direction section to stop the request signal and the start signal, in accordance with a completion signal generated when the first operation processor completes accessing the external memory.

2. The signal processor according to claim 1, wherein the first operation processor comprises:
   an access command memory which stores an access command to direct a content of the read/write processing in relation to the external memory;
   a read/write section which executes the read/write processing in relation to the external memory according to the access command stored in the access command memory during the access time period set by the access time period setting section;
   an internal memory into which data read from the external memory by the read/write processing executed by the read/write section is written, and from which data to be written into the external memory is read; and
   a signal processor which provides signal processing for the data stored in the internal memory independently of the read/write processing executed by the read/write section.

3. The signal processor according to claim 2, wherein when the read/write section reads an access command representing completion of accessing the external memory from the access command memory, the read/write section completes accessing the external memory, and at the same time generates the completion signal and supplies the completion signal to the access time period setting section.

* * * * *